United States Patent
Tritt

(10) Patent No.: US 8,245,261 B2
(45) Date of Patent: Aug. 14, 2012

(54) METHODS AND APPARATUS FOR PROVIDING REMOTE DIAGNOSTICS TO A TELEVISION RECEIVER

(75) Inventor: Pamela Margit Tritt, Erie, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 255 days.

(21) Appl. No.: 12/612,441

(22) Filed: Nov. 4, 2009

(65) Prior Publication Data

US 2011/0103562 A1    May 5, 2011

(51) Int. Cl.
*H04N 7/173* (2011.01)
*H04M 1/64* (2006.01)
*H04N 7/16* (2011.01)

(52) U.S. Cl. .......... 725/107; 725/99; 725/110; 725/140; 725/152; 379/88.17

(58) Field of Classification Search .............. 379/88.17; 714/25, 57; 725/107, 110, 140, 152, 99
See application file for complete search history.

(56) References Cited

U.S. PATENT DOCUMENTS

| | | | |
|---|---|---|---|
| 6,311,231 B1 * | 10/2001 | Bateman et al. | 379/265.09 |
| 7,890,816 B2 * | 2/2011 | Martch et al. | 714/57 |
| 2006/0259984 A1 * | 11/2006 | Juneau | 726/28 |
| 2009/0168978 A1 * | 7/2009 | Laws et al. | 379/93.17 |
| 2009/0212904 A1 * | 8/2009 | Yamashita et al. | 340/5.22 |
| 2009/0298535 A1 * | 12/2009 | Klein et al. | 455/556.1 |
| 2009/0300773 A1 * | 12/2009 | Pal | 726/27 |
| 2009/0307719 A1 * | 12/2009 | Clark et al. | 725/32 |
| 2011/0102675 A1 * | 5/2011 | Jackson | 348/558 |
| 2011/0107159 A1 * | 5/2011 | Martch et al. | 714/57 |
| 2011/0107378 A1 * | 5/2011 | Kooman | 725/87 |
| 2011/0138410 A1 * | 6/2011 | Sansom | 725/31 |
| 2011/0239260 A1 * | 9/2011 | Konishi | 725/109 |

* cited by examiner

*Primary Examiner* — Lisa Hashem

(74) *Attorney, Agent, or Firm* — Ingrassia Fisher & Lorenz, P.C.

(57) ABSTRACT

Described herein are techniques for allowing a customer support agent to remotely analyze a television receiver. A television receiver is communicatively coupled to a customer support center through a communication network. A customer support agent remotely accesses the television receiver and the television receiver transmits video content to the customer support center through the communication network. The video output is outputted to the customer support agent at the customer support center for analysis of the television receiver.

21 Claims, 4 Drawing Sheets

METHODS AND APPARATUS FOR PROVIDING REMOTE DIAGNOSTICS TO A TELEVISION RECEIVER

BACKGROUND

Television distribution networks and associated receiving equipment, such as set-top boxes, are often very complicated equipment. There are many hardware components, features and settings which may have potential problems within the television receiver. When a user of the television receiver calls customer support, a customer agent may walk the user through various troubleshooting procedures, trying to determine the source and/or remedy for the problem. Because the television receiver is located remotely with respect to the customer support agent (CSR), the CSR is unable to see the output of the television receiver or input commands to the television receiver. Therefore, it may be difficult for the customer agent to correctly diagnose a problem with the television receiver from the remote location. Often, the agent will order a technician out to physically look at the television receiver or have the customer physically return the television receiver to the operator for observation. Both options cost the operator significantly more money than having a customer support agent diagnose and remedy the problem over the telephone. Thus, it would be desirable for the customer support agent to have more flexibility to remotely diagnose problems on a customer's television receiver.

BRIEF DESCRIPTION OF THE DRAWINGS

The same number represents the same element or same type of element in all drawings.

DETAILED DESCRIPTION OF THE DRAWINGS

Figure 1:
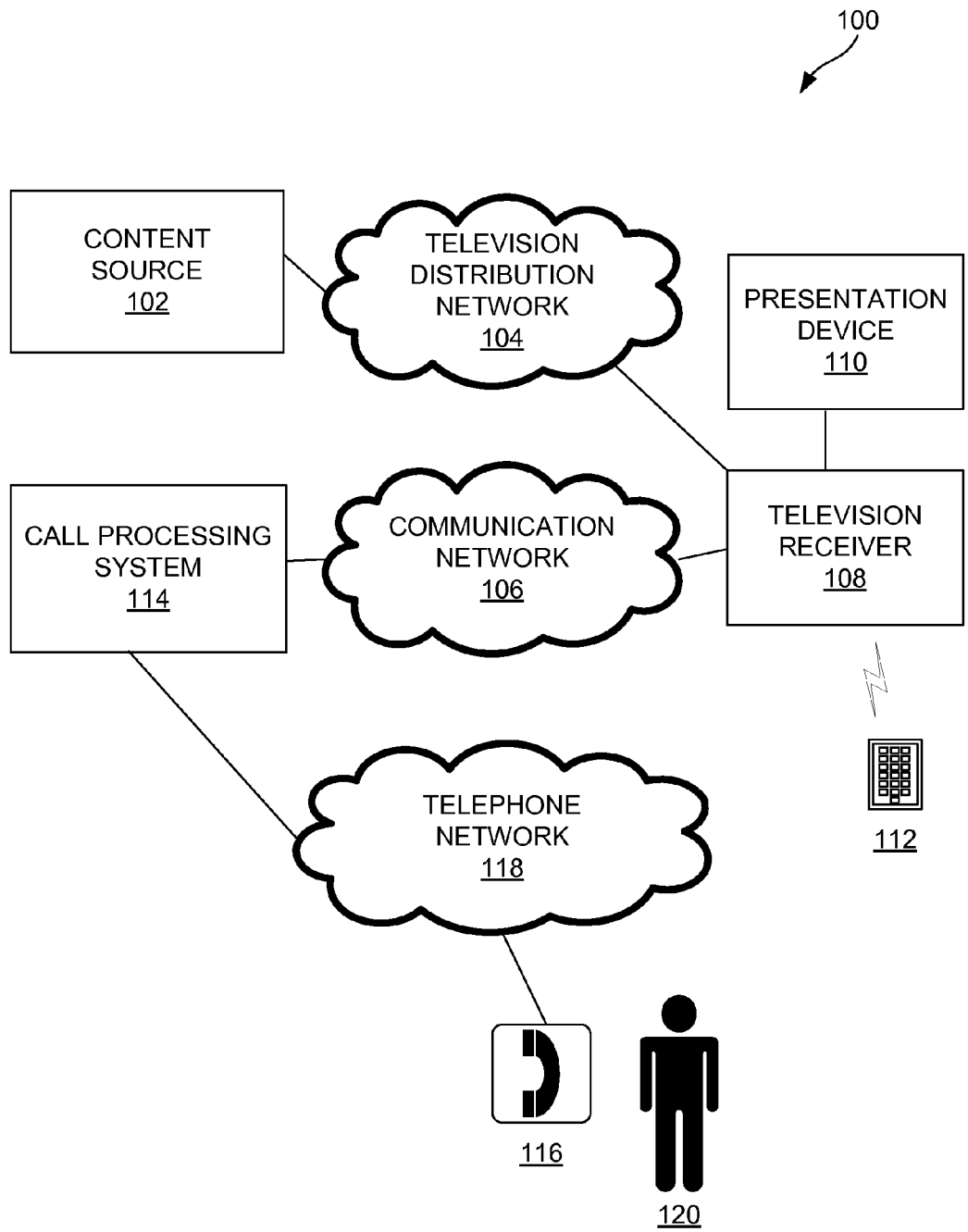
FIG. 1 illustrates an embodiment of a communication system.

Described herein are systems, methods and apparatus for allowing a customer support agent to remotely diagnose a television receiver. More particularly, described herein are techniques for customer support agents to remotely access and view the video output of a television receiver. Additionally, the customer support agent may be able to remotely enter commands into the television receiver, changing the operation of the television receiver. In short, described herein are systems, methods and apparatus for remotely connecting a customer support system to a television receiver.

One embodiment comprises a method for processing a customer support request. The method includes receiving, at a call processing system, a telephone call from a user and identifying a television receiver associated with the user. The method further includes connecting the call processing system to the television receiver via a communication network and receiving video content, at the call processing system, from the television receiver. The method further includes outputting the video content to an agent handling the telephone call, e.g., via a computer, web interface or the like. Thus, the agent can remotely view the video output of the television receiver and more easily diagnose problems with the television receiver or rule out various problems which may have been expected to exist. In at least one embodiment, the remote agent provides user input requesting to remotely control the television receiver. The user input is transmitted from the call processing system through the communication network to the television receiver and processed by the television receiver.

Another embodiment comprises a television receiver. The television receiver includes a receiver interface that receives input video data from a television distribution network and a network interface communicatively coupled to a call processing system located remotely with respect to the television receiver. The network interface is operable to exchange data with the call processing system. The television receiver also includes a processor communicatively coupled to the receiver interface and the network interface. The processor is operable to receive a command, via the network interface, from the call processing system, the command requesting the processor to change at least one operating parameter. Responsive to the command, the processor generates output video data and initiates transmission of the output video data to the call processing system.

Another embodiment comprises a call processing system. The call processing system includes a telephone interface operable to receive a telephone call from the user. The call processing system also includes a processor operable to identify a television receiver associated with the user and generate a request to communicate with the television receiver and a network interface communicatively coupled to the television receiver through a communication network. The network interface is operable to connect to the television receiver responsive to the request and receive video content from the television receiver. The processor is further operable to initiate output of the video content to an agent at the call processing system.

FIG. 1 illustrates an embodiment of a communication system 100. The communication system 100 includes a content source 102, a television distribution network 104, a communication network 106, a television receiver 108, a presentation device 110, a remote control 112, a call processing system 114, a telephone 116 and a telephone network 118. Each of the components of the communication system 100 will be described in greater detail below. The communication system 100 may include other components, elements or devices not illustrated for the sake of brevity.

The content source 102 is operable for receiving, generating and communicating content to one or more television receivers 108 through the television distribution network 104. The content to be received, processed, outputted and/or communicated may come in any of various forms including, but not limited to, audio, video, data, information, or otherwise. In at least one embodiment, the content source 102 is operable for receiving various forms and types of content from other sources, aggregating the content and transmitting the content to the television receiver 108 through the television distribution network 104. It is to be appreciated that the content source 102 may receive practically any form and/or type of information from one or more sources including streaming television programming, recorded audio or video, electronic programming guide data, video on demand, receiver applications and the like.

The television distribution network 104 is operable to transmit content from the content source 102 to the television receiver 108. The television distribution network 104 may comprise any type of wired (e.g., cable and fiber) and/or wireless (e.g., cellular, satellite, microwave, and other types of radio frequency) communication medium and any desired network topology (or topologies when multiple mediums are utilized). Exemplary television distribution systems 104 include terrestrial, cable, satellite and internet protocol television distribution systems. In at least one embodiment, the television distribution network 104 broadcasts or multicasts content to a plurality of television receivers 108. The television distribution network 104 may also distribute content to a specific addressable television receiver 108, such as video-on-demand content and the like. In at least one embodiment, the content source 102 may be embodied as a transmission facility of the television distribution network 104. Exemplary content sources 102 include over-the-air (OTA) terrestrial transmission facilities, cable television distribution headends, satellite television uplink centers, broadband or internet servers and the like. The television distribution network 104 may also distribute non-video content, such as electronic programming guide data and the like which is processed by the television receiver 108.

The communication network 106 is operable to communicatively couple the call processing system 114 to the television receiver 108. The television receiver 108 may bi-directionally communicate with the call processing system 114, receiving commands from the call processing system 114 and transmitting video content to the call processing system 114. The communication network 106 may also communicatively couple the television receiver 108 to other remotely located communication devices, such as computers, mobile telephones and the like. The communication network 106 may utilize any desired combination of wired (e.g., cable and fiber) and/or wireless (e.g., cellular, wireless, satellite, microwave, and radio frequency) communication mediums and any desired network topology (or topologies when multiple mediums are utilized). Exemplary communication networks include wireless communication networks, public switched telephone networks (PSTN), and local area networks (LAN) or wide area networks (WAN) providing data communication services.

In at least one embodiment, the television distribution network 104 and the communication network 106 may be combined into one or more physical or logical communication networks. For example, the television receiver 108 may receive video content over an internet protocol connection from the content source 102. In at least one embodiment, the television distribution network 104 and the communication network 106 may be carried over one physical communication medium, but may be divided into discrete logical communication networks. For example, a cable television distribution network may carry television broadcast data and internet traffic over a single communication medium into a home, but the television broadcast data and internet traffic may be divided into discrete logical networks.

The television receiver 108 is operable to receive content from the television distribution network 104 and output the received content for presentation by the presentation device 110. In at least one embodiment, the presentation device 110 is a display device (e.g., a television) configured to display content to a user 120. The television receiver 108 may receive an audio/video stream in any format (e.g., analog or digital format) and output the audio/video stream for presentation by the presentation device 110. In at least one embodiment, the television receiver 108 is a set-top box (e.g., a satellite television receiver, cable television receiver, terrestrial television receiver, internet protocol television receiver or any other type of receiver/converter box) or other similar device that processes and provides one or more audio and/or video output streams to the presentation device 110 for presentation to the user 120. The television receiver 108 may be further configured to output menus and other information that allow the user 120 to control the output of audio/video content by the television receiver 108, view electronic programming guides, set recording timers and the like.

In at least one embodiment, the television receiver 108 is configured to transmit content to other devices through the communication network 106. For example, the television receiver 108 may receive video content through the television distribution network 104, format the content for transmission through the communication network 106 and transmit the content to a computer, mobile telephone, personal digital assistant (PDA) or other internet enabled device. The television receiver 108 may also transmit locally stored content, e.g., recorded content, to remote devices through the communication network 106. In at least one embodiment, the television receiver 108 is operable to packetize the video content for transmission to remote devices. The operation of the video transmission functionality is described in further detail below.

The presentation device 110 may comprise any type of device capable of receiving and outputting a video signal in any format. Exemplary embodiments of the presentation device 110 include a television, a computer monitor, a liquid crystal display (LCD) screen, a touch screen and a projector. The presentation device 110 and the television receiver 108 may be communicatively coupled through any type of wired or wireless interface. For example, the presentation device 110 may be communicatively coupled to the television receiver 108 through a coaxial cable, component or composite video cables, an HDMI cable, a VGA or SVGA cable, a Bluetooth or WiFi wireless connection or the like. In some embodiments, the television receiver 108 and the presentation device 110 may be integrated as a device combining the functionality of a display device and a television receiver, such as a television with integrated CableCard functionality.

The user 120 may control the television receiver 108 using a remote control 112 or other type of data input device compatible with the television receiver 108. The remote control 112 may comprise any system or apparatus configured to remotely control the output of content by the television receiver 108. For example, the remote control 112 may include buttons for receiving input from the user 120. In at least one embodiment, the remote control 112 includes a touch pad for receiving input from the user 120. The remote control 112 may minimally include a transmitter, an input device (e.g., a keypad) and a processor or control logic for controlling the operation of the remote control 112. The remote control 112 may communicate commands to the television receiver 108 requesting to playback content, temporally move through content (e.g., fast-forward or reverse), adjust the volume, access electronic programming guides, set or edit recording timers, edit preferences of the television receiver and the like. In some embodiments, the remote control 112 may additionally be configured to remotely control the presentation device 110. The remote control 112 may communicate with the television receiver 108 and/or the presentation device 110 through any type of wireless communication medium, such as infrared (IR) signals or radio-frequency (RF) signals.

The telephone network 118 is operable to communicatively couple the telephone 116 with the call processing system 114. The telephone 116 may comprise any type of communication device offering telephone service, including plain old telephone service (POTS), mobile communication services (e.g., wireless telephones), voice over internet protocol (VoIP) services and the like. The telephone network 118 may be any type of network, such as a public switched telephone network, cellular network, VOIP network or the like.

The call processing system 114 is configured to receive telephone calls from the telephone 116 through the telephone network 118. Responsive to the telephone call, the call processing system 114 provides customer support to the user 120. The customer support offered to the user 120 may be automated, semi-automated or live agent support, or any combination thereof, depending on desired design criteria. The call processing system 114 may include various components for answering phone calls and offering customer support, as described in further detail below. In at least one embodiment, automated systems of the call processing system 114 receive a phone call from the user 120, identify the user 120 and direct the phone call to an appropriate agent for further support.

The call processing system 114 is further operable to communicate with the television receiver 108 through the communication network 106. More particularly, the television receiver 108 is operable to transmit a video output stream to the call processing system 114 through the communication network. The call processing system 114 is operable to receive the video output stream and display the corresponding content to a customer support agent (not shown in FIG. 1). The customer support agent views the content output by the call processing system 114 to diagnose a problem with the television receiver 108 or associated transmission lines, applications or the like.

In at least one embodiment, the call processing system 114 is further operable to transmit commands to the television receiver 108. The television receiver 108 may change its operational behavior responsive to the command. For example, the command may request the television receiver 108 to change channels, change inputs, access a particular menu, access video-on-demand content, recorded content, an electronic programming guide or a hidden diagnostic procedure. In at least one embodiment, the commands may be generated by the call processing system 114 responsive to user input from a customer support agent.

It is to be appreciated that the call processing system 114 may be operable to transmit any command which the user 120 can provide to the television receiver 108 using the remote control 112 and/or other input devices associated with the television receiver 108, e.g., a front panel display, keyboard and the like. In at least one embodiment, the call processing system 114 may access the television receiver 108 in a special mode, allowing a customer support agent to initiate transmission of commands to the television receiver 108 that are inaccessible by the user 120. For example, the customer support agent may be able to access diagnostic features of the television receiver 108 that are inaccessible using the remote control 112.

In at least one situation, the user 120 experiences a problem with the television receiver 108 and desires assistance from customer support. The user 120 utilizes the telephone 116 to place a customer support phone call, which is answered by the call processing system 114. The phone call is routed to a customer support agent (not shown in FIG. 1) of the call processing system 114. The customer support agent decides to access the television receiver 108 and the call processing system 114 identifies the television receiver 108 associated with the user 120. Depending on desired design criteria, the customer support agent may ask the user 120 for permission to access the television receiver 108 prior to initiating the communication.

The call processing system 114 then initiates a communication from the call processing system 114 to the television receiver 108. In at least one embodiment, the television receiver 108 may authenticate the call processing system 114 prior to allowing access to the television receiver 108. For example, the call processing system 114 may have authentication credentials which are generic to all television receivers 108 on a particular communication network or may have authentication credentials which are specific to the television receiver 108. In at least one embodiment, the authentication credentials are stored in association with identifying information regarding the user 120.

Responsive to authenticating the call processing system 114, the television receiver 108 initiates transmission of a video output stream to the call processing system 114. For example, the television receiver 108 may transmit the same video output stream as provided to the presentation device 110. In some embodiments, the television receiver 108 may transmit a different video output stream to the call processing system 114. For example, the television receiver 108 may enter a diagnostic mode and generate a video output stream that includes the content output to the presentation device 110 and that also includes additional diagnostic information and the like.

The call processing system 114 receives the video output stream and outputs the content to the customer support agent. In at least one embodiment, the call processing system 114 may be associated with a user input system, allowing the customer support agent the ability to provide input to remotely control the television receiver 108. For example, the customer support agent may be presented with a virtual remote control that allows the customer support agent to change channels on the television receiver 108, navigate menus and the like. Because the customer support agent is able to remotely access the television receiver 108, they can see what is being output by the television receiver 108 and/or how the television receiver 108 responds to particular input. Thus, it is more likely that the customer support agent can diagnose/remedy a problem with the television receiver 108 for the user 120 during the phone call, making it less likely that a truck roll or return of the equipment is needed.

Figure 2:
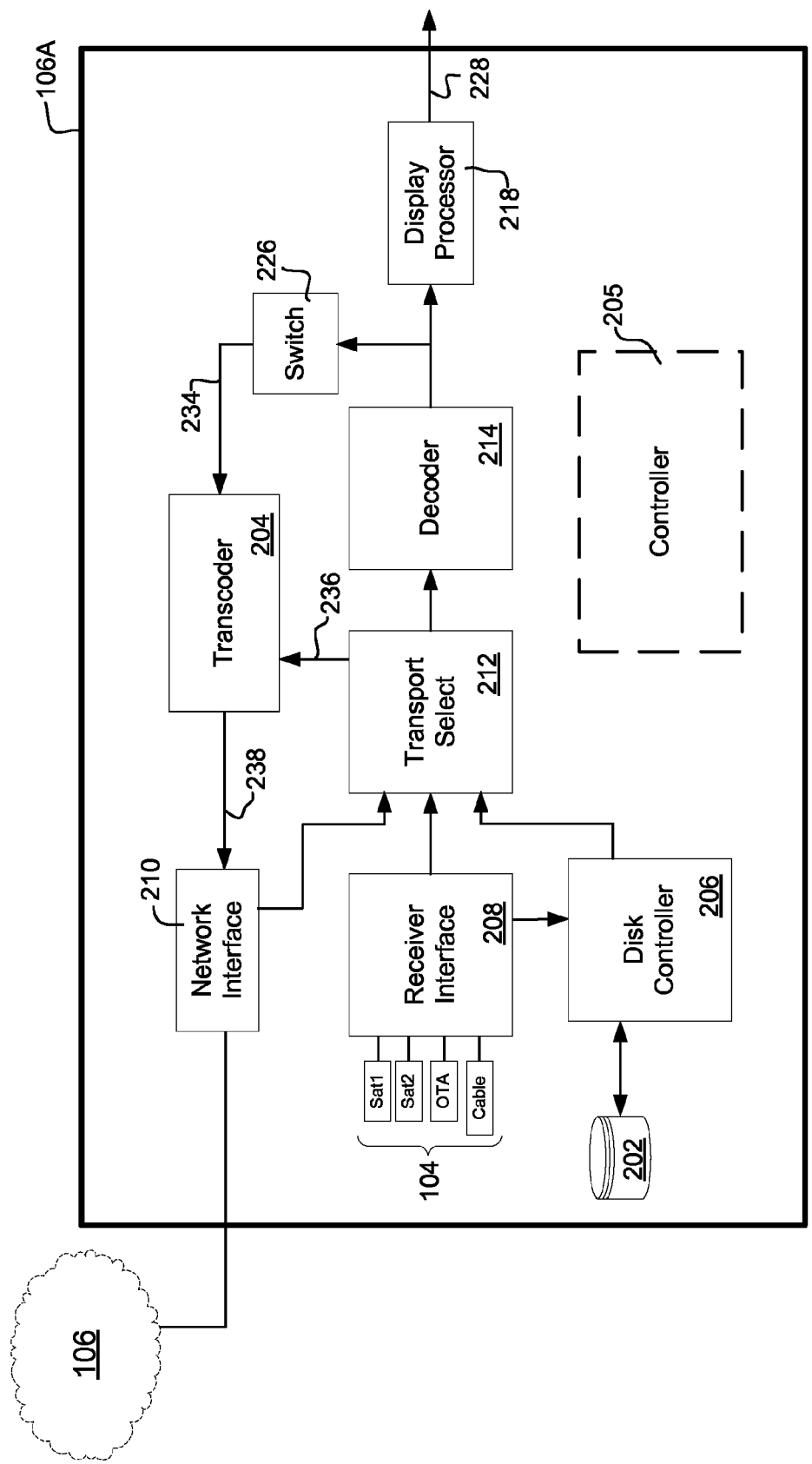
FIG. 2 provides additional detail about an embodiment of a television receiver.

FIG. 2 provides additional detail about an embodiment of a television receiver 108A. The television receiver 108A includes a receiver interface 208, a decoder 214 and a transcoder module 204, as appropriate. The television receiver 108A will be described in reference to the communication system 100 of FIG. 1. Other embodiments may incorporate additional or alternate processing modules from those shown in FIG. 2, may omit one or more modules shown in FIG. 2, and/or may differently organize the various modules in any other manner different from the exemplary arrangement shown in FIG. 2.

The television receiver 108A may be logically and physically implemented in any manner. FIG. 2 shows various logical and functional features that may be present in an exemplary television receiver 108A; each module shown in the figure may be implemented with any sort of hardware, software, firmware and/or the like. Any of the various modules may be implemented with any sort of general or special purpose integrated circuitry, for example, such as any sort of microprocessor, microcontroller, digital signal processor, programmed array and/or the like. Any number of the modules shown in FIG. 2, for example, may be implemented as a "system on a chip" (SoC) using any suitable processing circuitry under control of any appropriate controller 205. In various embodiments, controller 205 executes within an integrated SoC or other processor that implements receiver interface 208, transport selector 212, decoder 214, display processor 218 and/or disk controller 206, as appropriate. In such embodiments, the integrated SoC processor may interact with a transcoder module 204 implemented with a separate processor as well as any other input or output devices to produce desired outputs based upon inputs received from local or remote users. In other embodiments, transcoder module 204 may also be incorporated into the SoC design. Broadcom Corporation of Irvine, Calif., for example, produces several models of processors (e.g., the model BCM 7400 family of processors) that are capable of supporting SoC implementations of satellite and/or cable receiver systems, although products from any number of other suppliers could be equivalently used. In still other embodiments, various distinct chips, circuits or components may be inter-connected and inter-relate with each other to implement the receiving and decoding functions represented in FIG. 2.

Various embodiments of television receiver 108A therefore include any number of appropriate modules for obtaining and processing media content as desired for the particular embodiment. For example, the television receiver 108A may receive content through a satellite television distribution network, a cable television distribution network, an over-the-air (OTA) television distribution network, internet protocol television (IPTV) distribution network or the like, or any combination thereof, depending on desired design criteria. Each of these modules may be implemented in any combination of hardware and/or software using logic executed within any number of semiconductor chips or other processing logic.

Various embodiments of controller 205 can include any circuitry, components, hardware, software and/or firmware logic capable of controlling the various components television receiver 108A. Various routines, methods and processes executed within television receiver 108A are typically carried out under control of controller 205, as described more fully below.

As noted above, many embodiments of television receiver 108A include a receiver interface 208, which is any hardware, software, firmware and/or other logic capable of receiving media content via one or more content sources 102 through the television distribution network 104. Receiver interface 208 appropriately selects a desired input source and provides the received content to an appropriate destination for further processing. In various embodiments, received programming may be provided in real-time (or near real-time) to a transport stream select module 212 or other component for immediate decoding and presentation to the user. Alternatively, receiver interface 208 may provide content received from any source to a disk or other storage medium in embodiments that provide digital video recorder (DVR) functionality, such as the storage medium 202. In such embodiments, television receiver 108A may also include a disk controller module 206 that interacts with an internal or external storage medium 202, such as a hard disk, magnetic, optical or flash memory and/or other device that stores content.

In the embodiment shown in FIG. 2, television receiver 108A also includes an appropriate network interface 210, which operates using any implementation of protocols or other features to support communication by television receiver 108A on communication network 106. In various embodiments, network interface 210 supports conventional LAN, WAN or other protocols (e.g., the TCP/IP or UDP/IP suite of protocols widely used on the Internet) to allow television receiver 108A to communicate on communication network 106 as desired. Network interface 210 typically interfaces with communication network 106 using any sort of LAN adapter hardware, such as a conventional network interface card (NIC) or the like provided within television receiver 108A.

Transport stream select module 212 is any hardware and/or software logic capable of selecting a desired media stream from the available sources. In the embodiment shown in FIG. 2, stream select module 212 is able to generate video signals for presentation on one or more output interfaces 228. In various embodiments, stream select module 212 is also able to provide an encoded video signal 236 to transcoding module 204, although this feature is entirely optional. In such embodiments, however, transcoding module 204 would decode the video signal 236 for packetizing and subsequent transmittal over communication network 106, as described elsewhere.

More typically, however, stream select module 212 responds to viewer inputs (e.g., via controller 205) to simply switch encoded content received from the television distribution network 104 or from storage 202 to one or more decoder modules 214. Television receiver 108A may include any number of decoder modules 214 for decoding, decompressing and/or otherwise processing received/stored content as desired. Generally speaking, decoder module 214 decompresses or otherwise processes received content from stream select module 212 to extract an MPEG or other media stream encoded within the stream. The decoded content can then be processed by a display processor modules 218 to create a display for output to the presentation device 110 (see FIG. 1) in any appropriate format.

Display processor module 218 includes any appropriate hardware, software and/or other logic to create desired screen displays at interfaces 242, 244, 246 as desired. In various embodiments, display processing module 218 is also able to produce on screen displays (OSDs) for an electronic program guide, setup and control, input/output facilitation and/or other features that may vary from embodiment to embodiment. Such displays are not typically contained within the received or stored broadcast stream, but are nevertheless useful to users in interacting with television receiver 108A or applications accessible through the television receiver 108A and the like. The generated displays, including received/stored content and any other displays may then be presented to one or more output interfaces 228 in any desired format. In various embodiments, display processor 218 produces an output signal encoded in any standard format (e.g., ITU656 format for standard definition television signals or any format for high definition television signals) that can be readily converted to standard and/or high definition television signals at interface 228.

In television receiver 108A, a hardware or software switch 226 may also be provided that allows one or more output channels to be diverted to a transcoding module 204 for place shifting over the communication network 106. For example, the television receiver 108A may transmit content to remotely located devices, such as mobile telephones, computers, the call processing system 114 or the like In such embodiments, switch 226 suitably re-directs output from one of the output channels (e.g., channel 228) in decoded and decompressed form to the transcoding module 204 as appropriate. An output signal encoded in ITU656 format, for example, may be provided as an input to transcoding module 204 to support digital-to-digital conversion to a media format that can be readily transmitted on communication network 106. In other embodiments, digital or analog signals may be provided to transcoder module 204 in any format.

To that end, transcoding module 204 is any hardware, software, firmware and/or combination thereof that is capable of producing a media stream capable of being routed on communication network 106 to a remote device. In various embodiments, transcoding module is implemented in a semiconductor chip having digital signal processing capabilities, such as a DAVINCI model processor available from the Texas Instruments Corporation of Dallas, Tex., although other embodiments may use any sort of processor or other circuitry (including the same processor or other circuitry used to implement any other components shown in FIG. 2) to implement the transcoding function. Generally speaking, transcoding module 204 receives either a decoded signal 234 decoded by decoders 214 or 216 (and optionally further processed by display processors 218 or 220) or an already encoded stream 236, performs a digital-to-digital conversion to create a media stream in a desired format and having desired parameters, and provides the converted stream for transport on communication network 106.

FIG. 2 shows the output 238 of transcoding module 204, which includes the placeshifted video stream, as being provided for transport using network interface 210. In an alternate embodiment, a different network interface 210 could be provided, such as a stack residing within module 204 itself. In various embodiments, it may be desirable to secure any interchip communications between transcoding module 204 and other components of television receiver 108A through any sort of physical or logical security techniques. Signals 234, 236 and/or 238 may be provided on signal pins that are physically embedded within a printed circuit board, for example, to make access to such signals more difficult. Further, signals 234, 236 and/or 238 may be encrypted or encoded between modules in any manner to prevent unauthorized usage in the event that such signals are physically intercepted.

In operation, then, placeshifting television receiver 108A suitably receives one or more media streams from a DBS, cable or other content source 102, which may be stored in storage 202 or the like as desired. Received and/or stored content may be provided in compressed form (e.g., signal 236) and/or decompressed form (e.g., signal 234) to transcoding module 204, which appropriately converts the received signals to a format that can be transmitted to the remote device over network 106. Control of the placeshifting process, including any communications related to security or authentication, may take place under the direction of controller 205 executing within television receiver 108A.

As described above, the television receiver 108A is operable to communicate with the call processing system 114 during a customer support request, allowing a customer support agent to remotely access/control the television receiver 108A. During a customer support phone call by the user 120, a customer support agent initiates access by the call processing system 114 to the television receiver 108A through the communication network 106. The call processing system 114 may provide authentication credentials (such as a username/password pair, password/pin number or the like), which are processed by the controller 205, which then allows the call processing system 114 access to the television receiver 108A responsive to verifying the credentials.

In at least one embodiment, the call processing system 114 then issues commands to the television receiver 108A, which are received by the network interface 210 and processed by the controller 205. For example, the customer support agent may request the television receiver 108A to change channels and the controller 205 may command the receiver interface 208 to receive content from a different channel. The content received by the receiver interface 208 is then routed to the transcoder module 204, transcoded to an appropriate format for transmission through the network interface 210, packetized and transmitted by the network interface 210 through the communication network 106 to the call processing system 114.

In some embodiments, the customer support agent may remotely request to access various menus or other features of the television receiver 108A. For example, the customer support agent may request to access a system information menu, which is generated by the controller 205 and transmitted to the call processing system 114 via the network interface 210. The call processing system 114 then displays the information to the customer support agent for review.

Those of ordinary skill in the art will appreciate that the various functional elements shown as operable within the television receiver 108A may be combined into fewer discrete elements or may be broken up into a larger number of discrete functional elements as a matter of design choice. Thus, the particular functional decomposition suggested by FIG. 2 is intended merely as exemplary of one possible functional decomposition of elements within the television receiver 108A.

Figure 3:
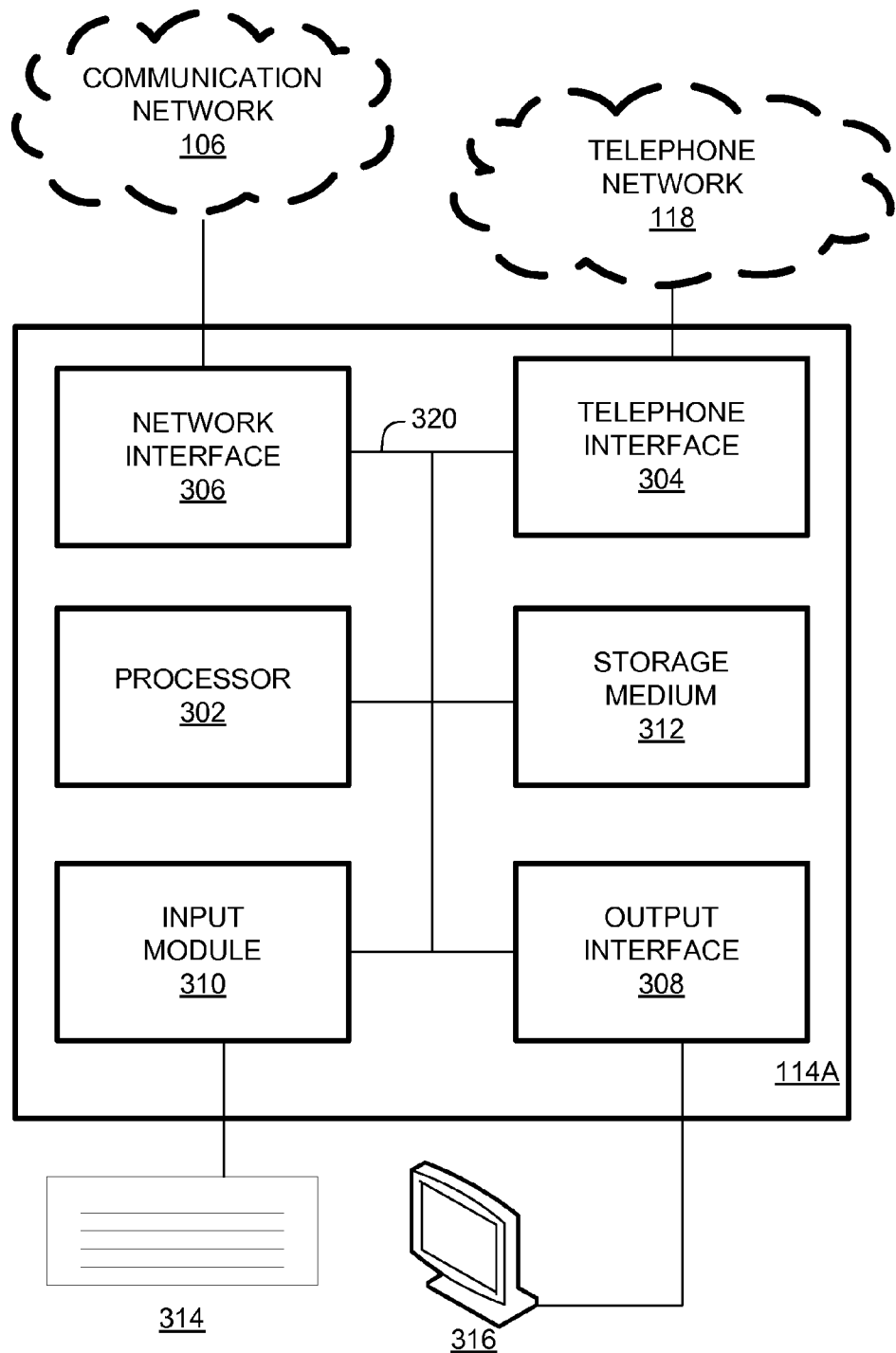
FIG. 3 illustrates an embodiment of a call processing system of FIG. 1.

FIG. 3 illustrates an embodiment of a call processing system of FIG. 1. The call processing system 114A will be described in reference to the communication system 100 illustrated in FIG. 1. The call processing system 114A includes a processor 302, a telephone interface 304, a network interface 306, an output interface 308, an input module 310 and a storage medium 312, all of which may be interconnected by one or more data buses 320. The call processing system 114A may be attached to or integrated with an input device 314 and a display device 316. Each of these components is described in greater detail below. The call processing system 114A may include other components, elements or devices not illustrated for the sake of brevity.

The processor 302 is operable for controlling the operation of the call processing system 114A. As used herein, processor 302 refers to a single processing device or a group of inter-operational processing devices. The operation of processor 302 may be controlled by instructions executable by processor 302. Some examples of instructions are software, program code and firmware. Various embodiments of processor 302 include any sort of microcontroller or microprocessor executing any form of software code. The processor 302 controls the reception of telephone calls by the telephone interface 304 and the reception and output of content by the network interface 306 and the output interface 308. In at least one embodiment, the processor 302 is operable to generate menus, output by the output interface 308 to the display device 316, which are utilized to assist customer support agents with the handling of calls from the user 120.

The processor 302 may also be operable to run various call answering/call routing applications or scripts. For example, the processor 302 may have various interactive voice response applications which handle different types of phone calls, such as billing, customer support, new orders and the like. Some of the interactive voice response applications may be operable to route calls to a live agent, depending on desired design criteria.

The telephone interface 304 may comprise any type of interface (e.g., a call processing board) for receiving a phone call from the telephone 116 (see FIG. 1) through the telephone network 118. In at least one embodiment, the telephone network 118 is embodied as a PSTN communicatively coupling the telephone interface 304 to the telephone 116 during a phone call. The telephone interface 304 answers/processes a received phone call to direct the phone call to other components of the call processing system 114 for processing of the phone call. For example, the telephone interface 304 may receive and digitize voice samples of the user 120 which are then processed by an interactive voice response application operating on the processor 302.

The network interface 306 is connected to a communication network 106 (see FIG. 1) and provides bi-directional data transmission between the television receiver 108 and the components of the call processing system 114A. In at least one embodiment, the network interface 306 is an Ethernet connection or other type of NIC communicatively coupled to the internet or other type of local area of WAN. It is to be appreciated that other types of wired and wireless connections may be utilized, such as WiFi, depending on desired design criteria.

Output interface 308 includes any appropriate hardware, software and/or other logic to create desired screen displays for output to the display device 316. For example, the output interface 308 may receive video content originating from the television receiver 108 and may output the video content to the display device 316 for presentation to a customer support agent. The output interface 308 may connect to the display device 316 using an appropriate wired or wireless connection. In various embodiments, output interface 308 is also able to produce on screen displays (OSDs) for data navigation, setup and control, input/output facilitation and/or other features that may vary from embodiment to embodiment. The display device 316 may comprise any appropriate apparatus, such as a monitor, television or the like.

In at least one embodiment, the display device 316 comprises a computer or similar device which remotely accesses the call processing system 114A. For example, the computer may receive video outputs from the output interface 308 via the communication network 106. Thus, the output interface 308 may provide displays to the network interface 306 for transmission to the display device 316 through the communication network 106.

The input module 310 is operable to receive user input from an input device 314, such as a keyboard, mouse, touch screen, microphone or the like. Any of these input devices may be directly connected to the call processing system 114A via the input module 310. In at least one embodiment, the input device 314 and the display device 316 may be integrated together, such as a touch screen device. The input device 314 and the display device 316 may also be embodied as a computer or other type of computing device that remotely connects to the call processing system 114A. Thus, the call processing system 114A may act as a server that customer support agents may connect to from various remote locations.

The storage medium 312 is operable to store various subscriber information, such as identifying information (e.g., name, address, contact information and the like), subscription plans, billing information and the like. In at least one embodiment, the storage medium 312 may store information identifying a network identifier for the television receiver 108 on the communication network 106. Thus, utilizing this information, the processor 302 may initiate communications between the call processing system 114A and the television receiver 108. The storage medium 312 may take the form of any type of storage device, such as a hard drive, flash memory, optical memory, random access memory (RAM), other type of magnetic memory and the like.

As previously described, the call processing system 114A allows a customer support agent to remotely access the television receiver 108. In practice, the user 120 places a phone call, which is received by the telephone interface 304. In at least one embodiment, the telephone interface 304 and the processor 302 cooperatively operate to identify the user and the reason for the phone call to appropriately route the call to a desired agent.

Once the phone call is routed to a customer support agent, the agent solicits information from the user 120 regarding the reason for their phone call (e.g., a problem with the television receiver 108). The customer support agent may then desire to remotely access the television receiver 108 and may request permission from the user 120 to access the television receiver 110. Responsive to the permission from the user 120, the customer support agent initiates the access and the processor 302 accesses the subscriber's information in the storage medium 312. In at least one embodiment, the user 120 may input information through the phone 116 allowing the processor 302 to access credentials for accessing the television receiver 108.

In at least one embodiment, the processor 302 retrieves a network identifier for the television receiver 108 and generates a message for transmission to the television receiver 108. The processor 302 then initiates transmission of the message to the television receiver 108 via the network interface 306. In at least one embodiment, the message may include authorization credentials for accessing the placeshifting capability of the television receiver 108.

Responsive to the message, the television receiver 108 generates a video output stream and transmits the video content to the call processing system 114A. The network interface 306 receives the video content and the processor 302 initiates output of the content to the display device 316 via the output interface 308. The customer support agent then views the video output and performs analysis to diagnose a problem with the television receiver 108.

In at least one embodiment, the customer support agent provides input, via the input device 314, requesting to remotely control the television receiver 108. For example, the display device 316 may display a virtual remote control which the customer support agent may provide input to remotely change channels, access menus, features and the like of the television receiver 108. The processor 302 receives the input and generates appropriate commands for transmission to the television receiver 108. The network interface 306 receives the commands and transmits the commands through the communication network 106 to the television receiver 108. The television receiver 108 may then change its operational state based on the command. Thus, the customer support agent is able to remotely control the television receiver 108, more easily diagnosing problems with the device.

Those of ordinary skill in the art will appreciate that the various functional elements shown as operable within the call processing system 114A may be combined into fewer discrete elements or may be broken up into a larger number of discrete functional elements as a matter of design choice. For example, one or more component may be embodied as servers located remotely with respect to each other. The various servers may then be communicatively coupled together through the data bus 320 and/or the communication network 106, depending on desired design criteria. Thus, the particular functional decomposition suggested by FIG. 3 is intended merely as exemplary of one possible functional decomposition of elements within the call processing system 114.

Figure 4:
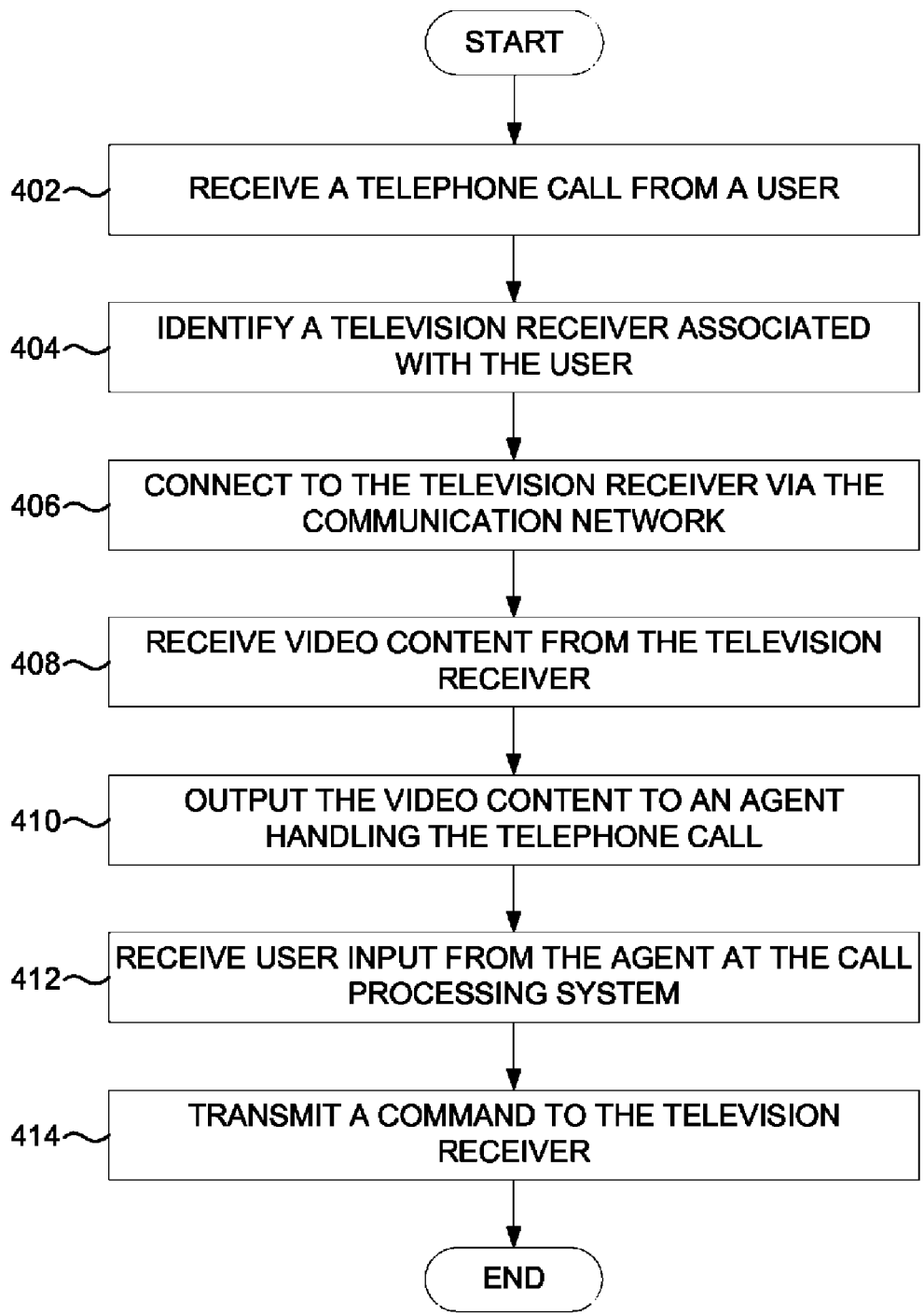
FIG. 4 illustrates an embodiment of a process for processing a customer support request.

FIG. 4 illustrates an embodiment of a process for processing a customer support request. The process of FIG. 4 may not be all inclusive and may include other operations not illustrated for the sake of brevity.

The process includes receiving a telephone call from a user (operation 402). For example, a call processing system, as described above, may receive a phone call from a user and route the call to an appropriate customer support agent. In other embodiments, the user may simply call a phone line which is answered by a customer support agent.

The process further includes identifying a television receiver associated with the user (operation 404). For example, a call processing system may include a database for looking up a network identifier for the television receiver based on input provided by the user. The identification may be performed automatically, by the call processing system, based on information identifying the user (e.g., phone number, account number, name and the like) or may be performed manually by a user performing a database query of a subscriber database.

The process further includes connecting to the television receiver via a communication network (operation 406). For example, the call processing system may initiate a connection with the television receiver through the communication network using the aforementioned network identifier. The process further includes receiving video content, at the call processing system, from the television receiver (operation 408) and outputting the video content to an agent handling the telephone call (operation 410). The process may optionally include receiving user input from the agent at the call processing system (operation 412) and responsive to the user input, transmitting a command from the call processing system to the television receiver (operation 414).

Although specific embodiments were described herein, the scope of the invention is not limited to those specific embodiments. The scope of the invention is defined by the following claims and any equivalents therein.

What is claimed:

1. A method of processing a customer support request by a computerized call processing system comprising a processing device, the method comprising:
   receiving, at the computerized call processing system, a telephone call from a user;
   identifying, by the computerized call processing system, a television receiver associated with the user;
   connecting the call processing system to the identified television receiver via a communication network;
   receiving video content, at the call processing system, from the identified television receiver that is connected to the call processing system; and
   outputting the video content received from the identified television receiver to a display for presentation to an agent handling the telephone call.

2. The method of claim 1, further comprising:
   receiving user input from the agent at the call processing system;
   responsive to the user input, transmitting a command from the call processing system to the television receiver over the communication network.

3. The method of claim 2, wherein
   the video content received from the identified television receiver is a placeshifted video stream that contains television programming that is transcoded from a television broadcast received at the television receiver.

4. The method of claim 2, wherein receiving the user input further comprises:
   receiving user input, from the agent, requesting to initiate output of video on-demand (VOD) content through the television receiver.

5. The method of claim 2, wherein receiving the user input further comprises:
   receiving user input, from the agent, requesting to initiate a diagnostic procedure through the television receiver.

6. The method of claim 2, wherein receiving the user input further comprises:
   receiving user input, from the agent, requesting to interact with an application operable on the television receiver.

7. The method of claim 2, further comprising:
   responsive to transmitting the command, receiving second video content, at the call processing system, from the television receiver via the communication network; and
   outputting the second video content to the display for viewing by agent.

8. A television receiver comprising:
   a hardware receiver interface that receives input video data from a television distribution network;
   a hardware network interface communicatively coupled to a call processing system located remotely with respect to the television receiver, the network interface operable to exchange data with the call processing system; and
   a processing device communicatively coupled to the receiver interface and the network interface, the processing device operable to:
      receive a command, via the network interface, from the call processing system, the command requesting the processing device to change at least one operating parameter;
      generate output video data responsive to the command; and
      initiate transmission of the output video data to the call processing system via the network interface.

9. The television receiver of claim 8 further comprising a transcoding module configured to convert a broadcast video stream received via the television distribution network into the output video data, wherein the output video data is a placeshifted media stream formatted to be routable to the call processing system via a communication network.

10. The television receiver of claim 8, wherein the command requests the processing device to re-direct the presentation of the output video data to the transcoding module.

11. The television receiver of claim 10, wherein the command requests the processing device to change a channel of the broadcast video stream and thereby change the content of the output video data generated by the transcoding module for transmission to the call processing system via a communication network.

12. The television receiver of claim 10, wherein the command requests the processing device to initiate output of video on-demand (VOD) content through the television receiver.

13. The television receiver of claim 10, wherein the command requests the processing device to initiate a diagnostic procedure.

14. The television receiver of claim 10, wherein the television distribution network comprises a satellite television distribution network.

15. The television receiver of claim 10, wherein the television distribution network comprises a cable television distribution network.

16. A call processing system comprising:
   a hardware telephone interface operable to receive a telephone call from the user;
   a processing device operable to identify a television receiver associated with the user and generate a request to communicate with the television receiver; and
   a hardware network interface communicatively coupled to the television receiver through a communication network, the network interface operable to connect to the television receiver responsive to the request and to receive video content from the television receiver;
   the processing device operable to initiate output of the video content to an agent at the call processing system.

17. The call processing system of claim 16, further comprising:
 a non-transitory storage medium that stores data associating information identifying the user with a network identifier for the television receiver;
 wherein the processing device utilizes the data to identify the television receiver and generate the request utilizing the network identifier.

18. The call processing system of claim 16, further comprising:
 an input interface operable to receive user input from an agent handling the telephone call;
 the processing device operable to generate a command responsive to the user input and to initiate transmission of the command to the television receiver via the network interface to thereby execute the command on the television receiver.

19. The call processing system of claim 18, wherein the video content received from the television receiver via the communication network is a placeshifted video stream that is controlled by the call processing system.

20. The call processing system of claim 18, wherein the command requests the television receiver to initiate output of video on-demand (VOD) content.

21. The call processing system of claim 18, wherein the command requests the television receiver to initiate a diagnostic procedure through the television receiver.

\* \* \* \* \*